(12) United States Patent
Sridharan et al.

(10) Patent No.: US 11,025,114 B2
(45) Date of Patent: Jun. 1, 2021

(54) ROTOR FOR AN ELECTRIC MACHINE

(71) Applicant: GE Aviation Systems LLC, Grand Rapids, MI (US)

(72) Inventors: Balamurugan Sridharan, Karnataka (IN); Rajendra Vishwanath Pawar, Karnataka (IN); Mamatha Ramakrishnaiah, Karnataka (IN); Xiaochuan Jia, Centerville, OH (US); Samir Dey, Mason, OH (US); Hao Huang, Troy, OH (US); Dhiraj Khushal Thakare, Karnataka (IN); Pankaj Kumar Morya, Karnataka (IN)

(73) Assignee: GE Aviation Systems LLC, Grand Rapids, MI (US)

(*) Notice: Subject to any disclaimer, the term of this patent is extended or adjusted under 35 U.S.C. 154(b) by 190 days.

(21) Appl. No.: 16/233,456

(22) Filed: Dec. 27, 2018

(65) Prior Publication Data

US 2020/0212742 A1 Jul. 2, 2020

(51) Int. Cl.
| | |
|---|---|
| *H02K 1/32* | (2006.01) |
| *H02K 1/16* | (2006.01) |
| *H02K 1/28* | (2006.01) |
| *H02K 9/19* | (2006.01) |
| *H02K 3/50* | (2006.01) |
| *H02K 3/24* | (2006.01) |

(52) U.S. Cl.
CPC ............... *H02K 1/32* (2013.01); *H02K 1/16* (2013.01); *H02K 1/28* (2013.01); *H02K 3/24* (2013.01); *H02K 3/50* (2013.01); *H02K 9/19* (2013.01)

(58) Field of Classification Search
CPC .. H02K 1/16; H02K 1/28; H02K 1/32; H02K 3/24; H02K 3/50; H02K 9/19; H02K 3/51; H02K 7/003
USPC .......................................................... 310/54
See application file for complete search history.

(56) References Cited

U.S. PATENT DOCUMENTS

| | | | | |
|---|---|---|---|---|
| 2,894,155 | A | * | 7/1959 | Labastie ................ H02K 9/19 |
| | | | | 310/54 |
| 3,663,849 | A | | 5/1972 | Heob et al. |
| 5,140,204 | A | * | 8/1992 | Cashmore ............. H02K 3/24 |
| | | | | 310/61 |

(Continued)

FOREIGN PATENT DOCUMENTS

| | | |
|---|---|---|
| DE | 235884 C | 2/1924 |
| DE | 2439383 A1 | 3/1976 |

(Continued)

OTHER PUBLICATIONS

European Patent Office, Extended European Search Report re Corresponding Application No. 19215720.4-1201, May 7, 2020, 11 pages, Munich, Germany.

*Primary Examiner* — Alex W Mok
(74) *Attorney, Agent, or Firm* — McGarry Bair PC

(57) ABSTRACT

A rotor for an electric machine includes a core having circumferentially-spaced, axially-extending posts, and defining an axial passage, a winding carried by each of the posts and comprising an electrically-conductive wire repeatedly wound around the post such that a portion of the winding extends axially beyond the post to define an overhang with upper and lower surfaces connected by an end, and a hollow shaft defining a rotor inner surface and a rotor outer surface.

19 Claims, 8 Drawing Sheets

(56) References Cited

U.S. PATENT DOCUMENTS

| | | | | |
|---|---|---|---|---|
| 5,237,227 | A | * | 8/1993 | Huss ...................... H02K 9/197 |
| | | | | 310/54 |
| 5,256,035 | A | | 10/1993 | Norris et al. |
| 5,666,016 | A | * | 9/1997 | Cooper ................... H02K 3/24 |
| | | | | 310/270 |
| 6,232,687 | B1 | | 5/2001 | Hollenbeck et al. |
| 6,648,715 | B2 | | 11/2003 | Wiens et al. |
| 2004/0036365 | A1 | * | 2/2004 | Doherty .............. H02K 11/042 |
| | | | | 310/52 |
| 2004/0051405 | A1 | * | 3/2004 | Doherty ................. H02K 1/325 |
| | | | | 310/58 |
| 2010/0164310 | A1 | * | 7/2010 | Dames .................... H02K 1/32 |
| | | | | 310/54 |
| 2015/0249370 | A1 | * | 9/2015 | Wirsch, Jr. ............. H02K 3/527 |
| | | | | 310/54 |
| 2017/0271955 | A1 | * | 9/2017 | Hanumalagutti ........ B60K 1/00 |

FOREIGN PATENT DOCUMENTS

| | | | |
|---|---|---|---|
| EP | 2784918 | A1 | 10/2014 |
| FR | 2220910 | | 10/1974 |
| GB | 2298965 | A | 9/1996 |
| JP | 54144010 | | 3/1953 |

\* cited by examiner

ROTOR FOR AN ELECTRIC MACHINE

BACKGROUND

Electric machines, such as electric motors or electric generators, are used in energy conversion. In the aircraft industry, it is common to combine a motor mode and a generator mode in the same electric machine, where the electric machine in motor mode functions to start the engine, and, depending on the mode, also functions as a generator. Regardless of the mode, an electric machine typically includes a rotor having rotor windings that are driven to rotate by a source of rotation, such as a mechanical or electrical machine, which for some aircraft may be a gas turbine engine. A cap or end support can contribute to retaining the rotor windings as they rotate.

BRIEF DESCRIPTION

In one aspect, the present disclosure relates to a rotor for an electric machine including a core having circumferentially-spaced, axially-extending posts, a winding carried by each of the posts and comprising an electrically-conductive wire repeatedly wound around the post such that a portion of the winding extends axially beyond the post to define an overhang with upper and lower surfaces connected by an end, and a cradle supporting at least the lower surface of the overhang and having a first coolant opening fluidly coupled to the overhang lower surface.

In another aspect, the present disclosure relates to a rotor for an electric machine including a core having circumferentially-spaced, axially-extending posts, and defining an axial passage, a winding carried by each of the posts and comprising an electrically-conductive wire repeatedly wound around the post such that a portion of the winding extends axially beyond the post to define an overhang with upper and lower surfaces connected by an end, a hollow shaft defining a rotor inner surface and a rotor outer surface, and a cradle having a collar circumscribing the outer surface of the hollow shaft and a C-shaped channel supported by the collar and defining a first wall confronting the lower surface, a second wall confronting the upper surface, and a third wall confronting the end, with at least one of the first, second, and third walls having a coolant opening fluidly coupled to the overhang.

DETAILED DESCRIPTION

Figure 1:
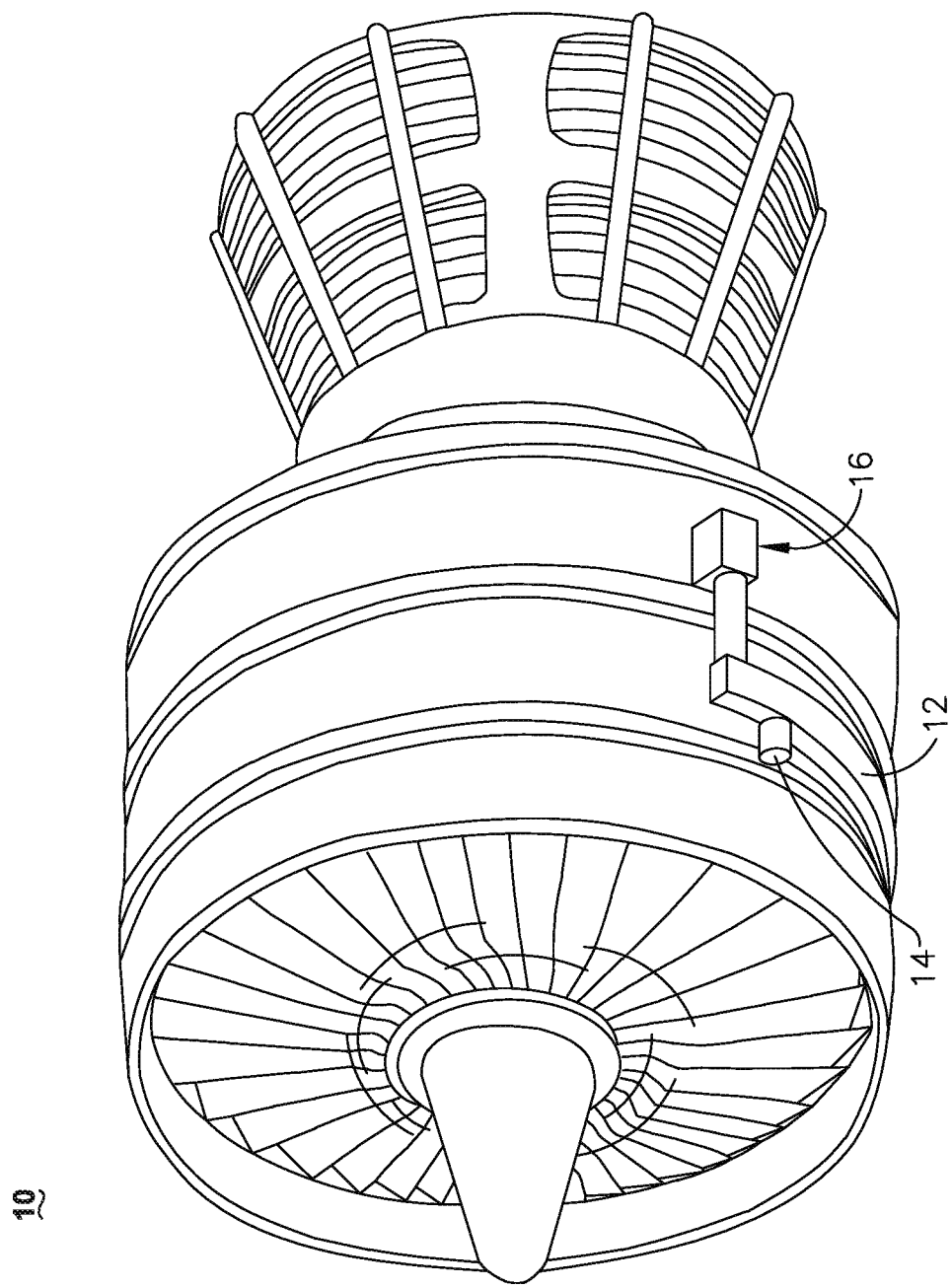
FIG. 1 is an isometric view of a gas turbine engine having a generator, in accordance with various aspects described herein.

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Additionally, non-limiting aspects of the disclosure are applicable for distributed windings, concentric windings, or a combination thereof. Thus, a brief summary of a contemplated environment should aid in a more complete understanding.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "wet" cavity generator includes a cavity housing the rotor and stator that is exposed to free liquid coolant (e.g. coolant freely moving within the cavity). In contrast, a "dry" cavity generator the rotor and stator can be cooled by coolant contained within limited in fluidly sealed passages (e.g. non-freely moving about the cavity).

The exemplary drawings are for purposes of illustration only and the dimensions, positions, order and relative sizes reflected in the drawings attached hereto can vary.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein. While a generator 14 is shown and described, aspects of the disclosure can include any electrical machine or generator.

Figure 2:
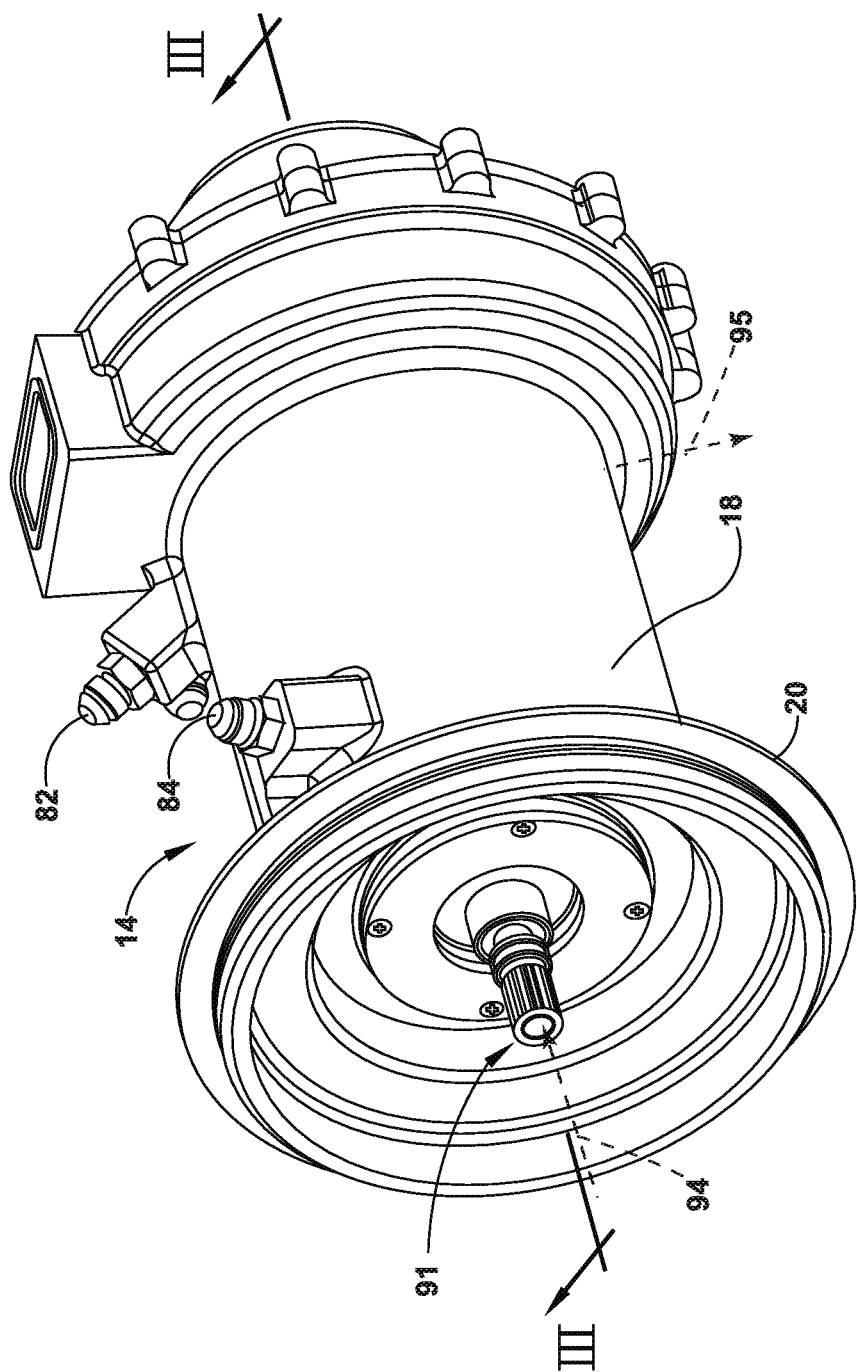
FIG. 2 is an isometric view of an exterior of the generator of FIG. 1, in accordance with various aspects described herein.

FIG. 2 more clearly illustrates a non-limiting example generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and output ports 82, 84 can be utilized for cooling at least a portion of a rotor or stator of the generator 14. The liquid cooling system can also include a second coolant outlet port 91, shown at a rotatable shaft portion of the generator 14. Optionally, by way of non-limiting example, the liquid cooling system can include a rotatable shaft coolant inlet port 94 or a generator coolant outlet port 95. While not shown, aspects of the disclosure can further include other liquid cooling system components, such as a liquid coolant reservoir fluidly coupled with the cooling fluid inlet port 82, the rotatable shaft coolant inlet port 94, the cooling fluid outlet port 84, or the generator coolant outlet port 95, and a liquid coolant pump to forcibly supply the coolant through the ports 82, 84, 94, 95 or generator 14.

Figure 3:
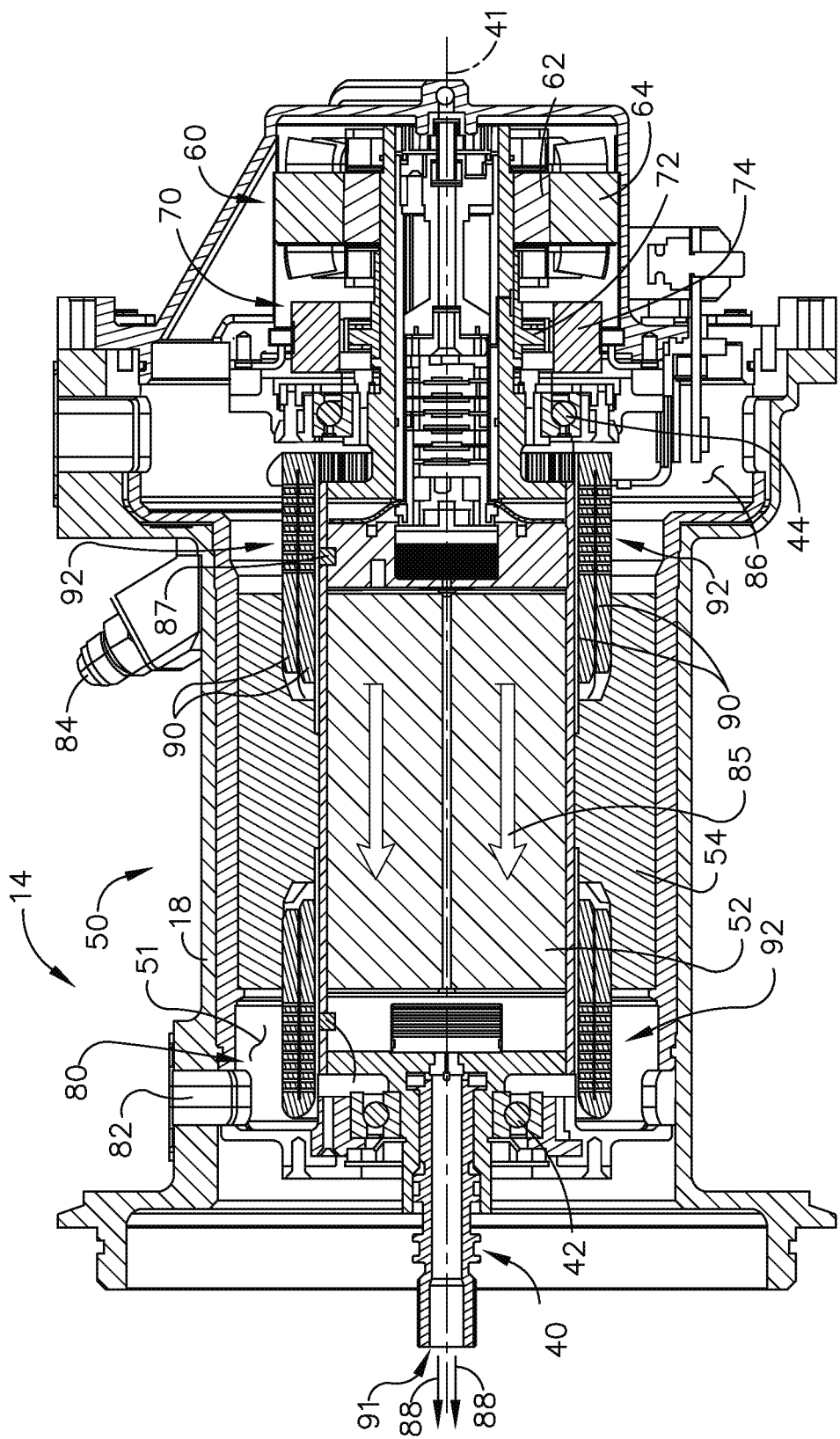
FIG. 3 is a schematic cross-sectional view of the generator of FIG. 2, taken along line III-III of FIG. 2, in accordance with various aspects described herein.

A non-limiting interior of the generator 14 is best seen in FIG. 3, which is a cross-sectional view of the generator 14 shown in FIG. 2 taken along line III-III. A hollow rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on and co-rotate with the rotatable shaft 40. The fixed components can be mounted to any suitable part of the housing 18, and include the main machine stator 54, exciter stator 64, and PMG stator 74. Collectively, the fixed components define an interior through which the rotatable shaft 40 extends and rotates relative to.

It will be understood that the main machine rotor 52, exciter rotor 62, and PMG rotor 72 can have a set of rotor poles, and that the main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of main machine stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the generator 14 can be oil cooled and thus can include a cooling system 80. The cooling oil can be used to dissipate heat generated by the electrical and mechanical functions of the generator 14. The cooling system 80 using oil can also provide for lubrication of the generator 14. In the illustrated aspects, the generator 14 can be a liquid cooled, wet cavity cooling system 80 including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more channels or paths for coolant or fluid coolant flow 85 (shown schematically as arrows) for the main machine rotor 52, exciter rotor 62, and PMG rotor 72, as well as an rotor shaft cooling fluid outlet 88, such as the second coolant outlet port 91, wherein residual, unused, or unspent oil can be discharged from the rotatable shaft 40.

In non-limiting examples of the generator 14, the fluid coolant flow 85 can further be directed, exposed, sprayed, or otherwise deposited onto the set of main machine stator windings 90, the set of stator winding end turns 92, or onto alternative or additional components. In this example, the fluid coolant flow 85 can flow from the rotatable shaft 40 radially outward toward the set of stator windings 90 or the set of stator winding end turns 92. In this sense, the coolant can cool the respective set of stator windings 90 or set of stator winding end turns 92.

Figure 4:
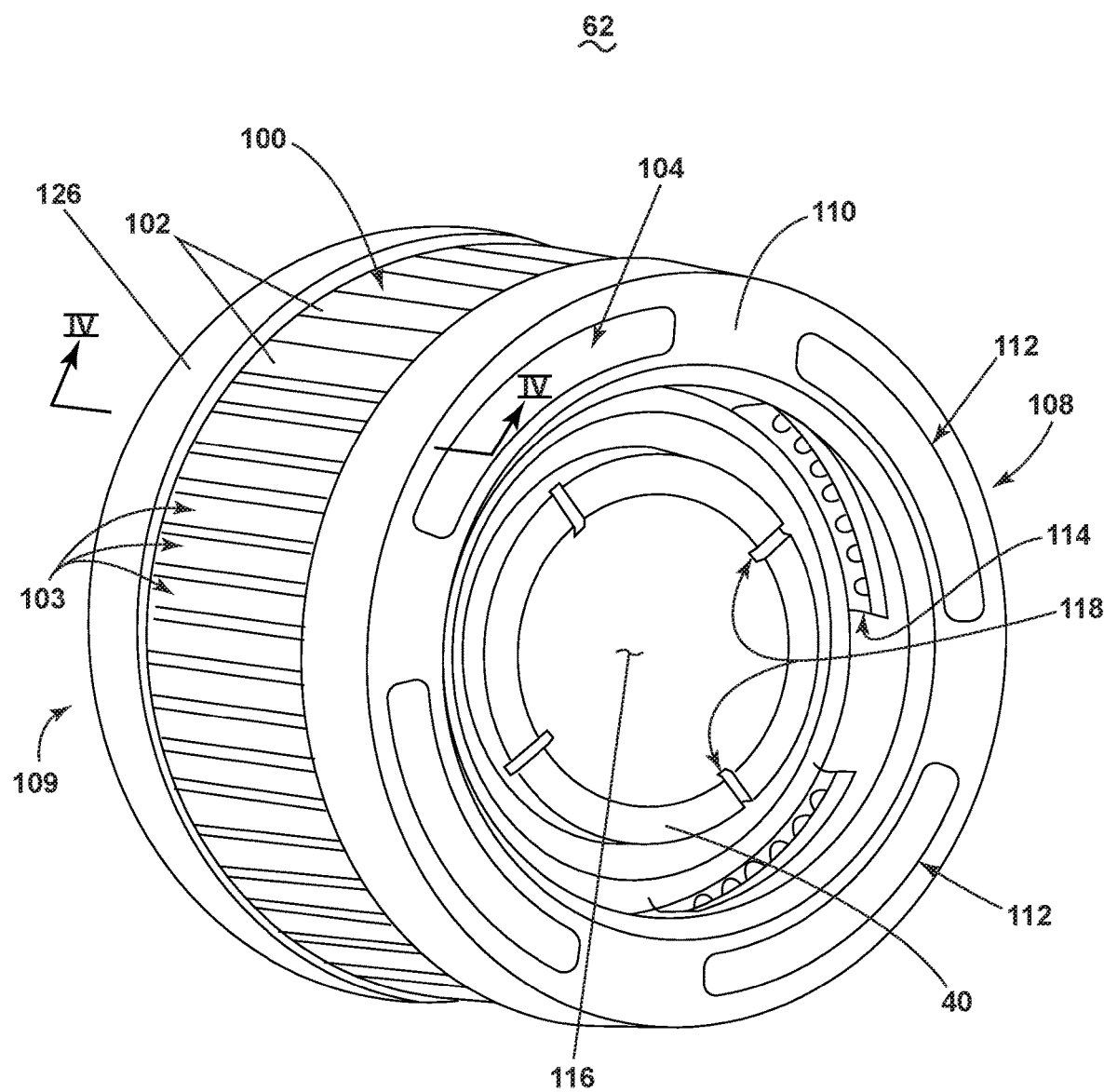
FIG. 4 is an isometric view of the exciter rotor of the generator of FIG. 1 and end support, in accordance with various aspects described herein.

FIG. 4 illustrates an isometric view of the exciter rotor 62 or exciter rotor assembly. As shown, the exciter rotor 62 can include a circumferentially extending exciter rotor core 100, such as a laminated rotor core, defining an axial passage encircling the rotatable shaft 40 and rotatably connected to co-rotate with the rotatable shaft 40. The exciter rotor core 100 can include a set of circumferentially-spaced, axially-extending exciter posts 102 or teeth defining slots between adjacent posts 102. The exciter rotor 62 can include at least one rotor pole 103 defined by a respective rotor post 102 and formed when at least a portion of the rotor core 100 is wound with a conductive rotor conductor, wire, or windings, about the rotor post 102. As shown schematically, a set of exciter rotor windings 104 are wound about the set of rotor posts 102 (e.g. in the slots between adjacent posts 102) to define a set of rotor poles 103. In this sense, a winding 104 is carried by each of the posts 102 and comprising an electrically-conductive wire repeatedly wound around the post 102 such that a portion of the winding extends axially beyond the post 102 to define an overhang with upper and lower surfaces connected by an end (e.g. an "end turn").

At each opposing axial end of the of the exciter rotor 62, the set of exciter rotor windings 104 can be at least partially supported or contained by an end cap 110. In this sense, the set of exciter rotor windings 104, or portions thereof is differential in both side and requires balanced support structure to contain winding 104 movement radially outward and inward. As shown in for the foreground in the perspective of FIG. 4, a first axial end 108 of the exciter rotor 62 includes a first end cap 110, while a second axial end 109 at opposing end of the exciter rotor 62 can include a second end cap 126. Non-limiting aspects of the first and second end caps 110, 126 can be substantially similar or different depending on the needs of the exciter rotor 62. While further discussion of the first and second end caps 110, 126 will be primarily directed toward the example of the first end cap 110, aspects of the disclosure can be applicable to the second end cap 126, as well.

The first end cap 110 can include a set of apertures or openings allowing or providing access to the underlying set of exciter rotor windings 104. As shown, aspects of the disclosure can include a set of axial-facing coolant openings 112 or slots, a set of first radially-inward facing coolant openings 114 or slots, or a combination thereof. Also as illustrated, the rotatable shaft 40 can include a radially-extending set of shaft openings 118 allowing access to an inner cavity 116 of the rotatable shaft 40, such as the cavity 116, defining a coolant passage having the fluid coolant flow 85 (not shown). In this sense, the set of shaft openings 118 can extend from an inner surface of the rotatable shaft 40 to an outer surface of the rotatable shaft 40. While four circumferentially spaced shaft openings 118 are shown, any number of shaft openings 118 can be included. Additionally, the set of shaft openings 118 can be circumferentially arranged to align with the set of first coolant openings 114.

By way of non-limiting example, the end cap 110 can be fixed to the rotatable shaft 40 using one or more bolts, screws, pins, or other known fasteners. It is also contemplated that the end cap 110 and the rotatable shaft 40 can be fixed by any affixing mechanisms.

Figure 5:
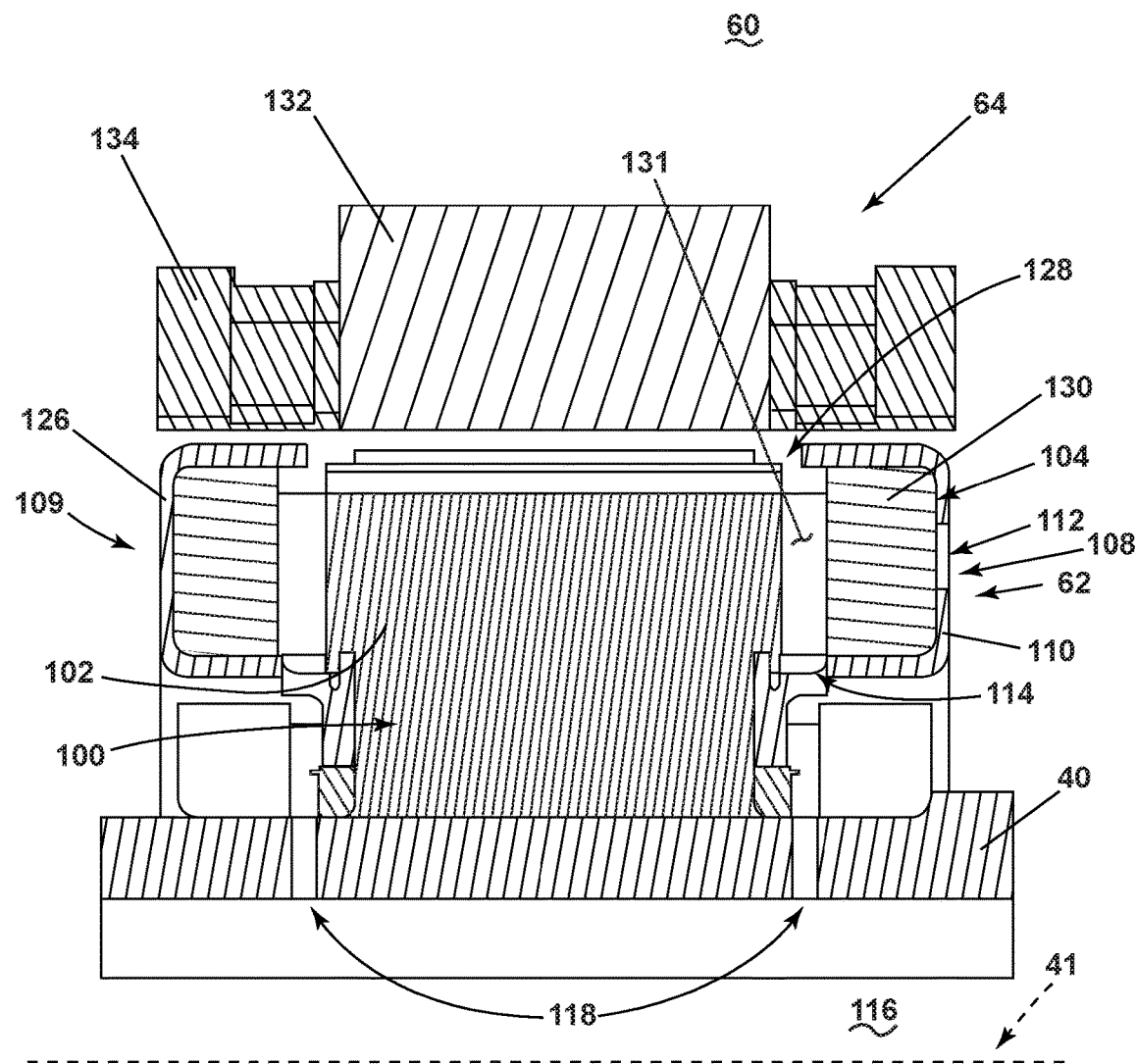
FIG. 5 is a schematic cross-sectional view of the exciter of the generator of FIG. 1, taken along line V-V of FIG. 4, in accordance with various aspects described herein.

FIG. 5 illustrates a cross-sectional view of the exciter 60, including the exciter rotor 62 and the exciter stator 64. The set of exciter rotor windings 104 wound around the rotor post 102 can define rotor winding end turns 130 extending axially beyond the rotor core 100 or rotor post 102. In one non-limiting example, the rotor winding end turns 130 can be at least partially axially spaced from the rotor post 102, defining a gap 131 or radially-extending opening. The gap 131 can further define a second coolant opening 128 or slots (or a set thereof). Stated another way, the outer wall of the end cap 110 can terminate short of the rotor core 100 to define at least one of the gap 131 or the set of second coolant openings 128. In another non-limiting example, the gap 131 can be defined by tubes, cuts, or another structural element about which the set of exciter rotor windings 104 are wound. The exciter rotor 62 can also be configured to define a set of second outwardly-facing coolant openings 128 at a radially outward wall of the end cap 110. As shown, the exciter rotor 62 can be arranged or aligned with at least a subset of the shaft openings 118, at least a subset of the first coolant openings 114 of the end cap 110, the gap 131, the set of second coolant openings 128, or a combination thereof, define a continuous or contiguous radial opening or passageway fluidly coupled to one another and the set of exciter rotor windings 104 and the rotor winding end turns 130.

Generally, the end cap 110 can include a collar circumscribing the outer surface of the rotatable shaft 40 in a C-shaped wall, set of walls, channel, or the like, supported by the collar and that axially envelop, contain, retain, or otherwise cradle the rotor winding end turns 130. In this sense, the end cap 110 can support the rotor winding end turns 130.

FIG. 5 further illustrates a schematic representation of the exciter stator 64, having at least an exciter stator core 132 and a set of exciter stator windings 134. As shown, the exciter stator core 132 is radially spaced from and generally sized to match the exciter rotor core 100, and the set of exciter stator windings 134 extend axially along and beyond the exciter stator core 132, and are radially spaced from and generally sized to match the set of exciter rotor windings 104. In one non-limiting example, at least a portion of the set of exciter stator windings 134 can be radially aligned with the set of second coolant openings 128.

Figure 6:
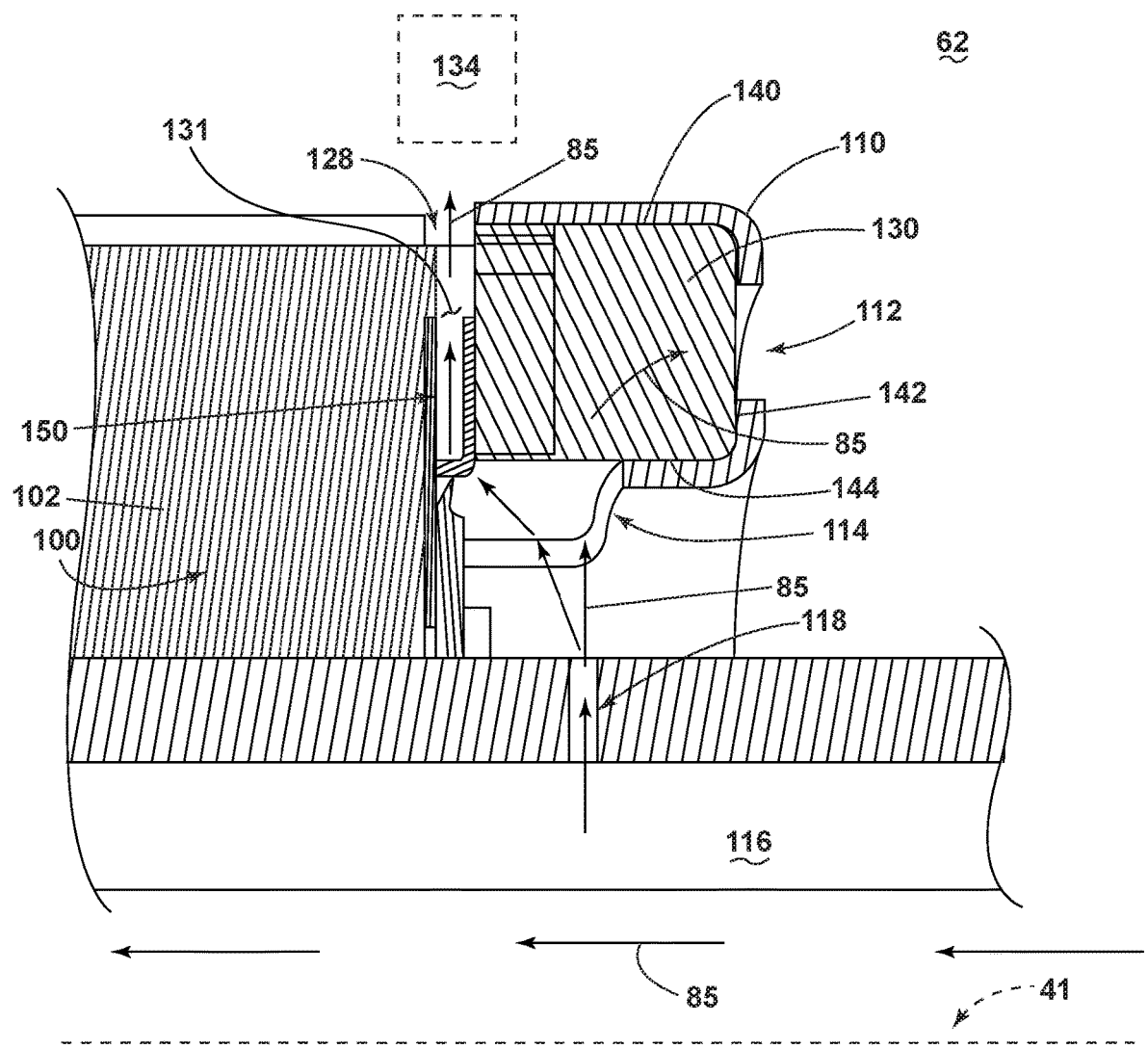
FIG. 6 illustrates a zoomed cross-sectional view of the exciter rotor and end support of FIG. 5, in accordance with various aspects described herein.

FIG. 6 illustrates a schematic zoomed view of the exciter rotor 62 wherein coolant traverses a set of passages. As shown, a first interface 140 is between an upper surface of the overhanging rotor winding end turns 130 and an under or lower surface of the end cap 110. Similarly, a second interface 142 is between an axial surface of the overhanging rotor winding end turns 130 and an axial surface of the end cap 110. Finally, a third interface 144 is between an under or lower surface of the overhanging rotor winding end turns 130 and an upper surface of the end cap 130. In this sense, the end cap 110 can be configured or adapted to support at least one of the upper, axial, or lower surfaces of the overhanging rotor winding end turns 130, or a combination thereof. As used herein, under, lower, axial, upper, and like denotes a radially relative position between respective elements.

During operation, the cooling system 80 flows the fluid coolant flow 85 (schematically shown as arrows) through at least a portion of the exciter rotor 62. As shown, fluid coolant flow 85 received in the cavity 116 of the rotatable shaft 40 can traverse radially outward through the set of shaft openings 118. The direction or location of the fluid coolant flow 85, including a source of coolant (not shown) is not limited by the illustration and can be considered in any location that is fluidly coupled to the cavity 116 of the rotatable shaft 40. It is further considered that additional conduit, pumps, valves, or other devices can be included to fluidly connect the fluid coolant flow 85 to the rotatable shaft.

The fluid coolant flow 85 is expelled radially outward from the set of shaft openings 118 toward the overlying set of first coolant openings 114. The set of first coolant openings 114 fluidly receives the fluid coolant flow 85, and further directs the fluid coolant flow 85 toward the set of exciter rotor windings 104 and rotor winding end turns 130. Non-limiting aspects of the disclosure can be included wherein surfaces, walls, or the like can be configured or adapted at the set of shaft openings 118, the set of first coolant openings 114, or the like, to ensure the expected directing of the fluid coolant flow 85 toward the set of exciter rotor windings 104 and rotor winding end turns 130. In this sense, the set of first coolant openings 114 can be configured to overlie the fluid output volume from the set of shaft openings 118, such that fluid expelled from the set of shaft openings 118 is received by set of first coolant openings 114 reliably. At least a portion of the fluid coolant flow 85 can be received in the gap 131 and can further flow radially outward past at least a portion of the set of rotor windings 104, past at least a portion of the rotor core 100, or a combination thereof.

In another non-limiting aspect of the disclosure, the fluid coolant flow 85 can be received by the set of second coolant openings 128, and expelled radially outward beyond the exciter rotor 62. In one example, the fluid coolant flow 85 can be expelled outward toward the set of stator windings 134, shown schematically in boxed form. In yet another non-limiting aspect of the disclosure an axially-outer-facing wall 150 of the rotor core 100 or rotor post 102 can be adapted or configured to include a surface to direct or redirect the fluid coolant flow 85 as desired, to ensure or allow for proper flow toward the set of rotor windings 104 or set of rotor winding end turns 130, or toward the set of second coolant openings 128. Similarly, non-limiting aspects of the set of second coolant openings 128 can include a set of shaped walls, surfaces, nozzles, or the like, such that the fluid coolant flow 85 is directed or redirected, as needed, toward the set of stator windings 134.

As further shown, non-limiting aspects of the disclosure can be included wherein another portion of the fluid coolant flow 85 can flow through the rotor winding end turns 130 toward, and be axially expelled from, the set of axial coolant openings 112.

Thus, non-limiting aspects of the disclosure enable or allow for a fluid delivery passageway. Fluid can enter the rotatable shaft 40 via the inlet port 82. The rotatable shaft 40 at least in part, can define the cavity 116, from which fluid can flow radially outward relative to the rotational axis 41. The fluid coolant supplied from the cavity 116 of the rotatable shaft 40 is fluidly delivered through the set of shaft openings 118, into the set of first coolant openings 114, along the gap 131 between the rotor core 100 and the rotor winding end turns 130, and out of the set of second coolant openings 128, optionally toward the set of stator windings 134. It is contemplated that the fluid can be, but is not limited to, coolant.

During operation of the generator 14, the magnetic field generated by the set of exciter stator windings 134 relative to the rotating set of exciter rotor windings 104 induces current in the set of exciter rotor windings 104. This magnetic interaction further generates heat in at least one of set of exciter rotor windings 104 and exciter stator windings 134. In accordance with aspects described herein, the fluid coolant flow 85 can be delivered from the rotatable shaft 40 through the set of shaft openings 118, into the set of first coolant openings 114 and past at least one of the rotor core 100, the set of exciter rotor windings 104, the rotor winding end turns 130, or a combination thereof. The fluid coolant flow 85 past the at least one of the rotor core 100, the set of exciter rotor windings 104, the rotor winding end turns 130, or a combination thereof transfers heat from the rotor core 100, the set of exciter rotor windings 104, or the rotor winding end turns 130 into the coolant by conduction. The coolant is radially expelled from set of second coolant openings 128, and optionally further radially expelled outward to contact the set of exciter stator windings 134. This contacting further removes heat from the exciter stator windings 134 into the coolant.

Figure 7:
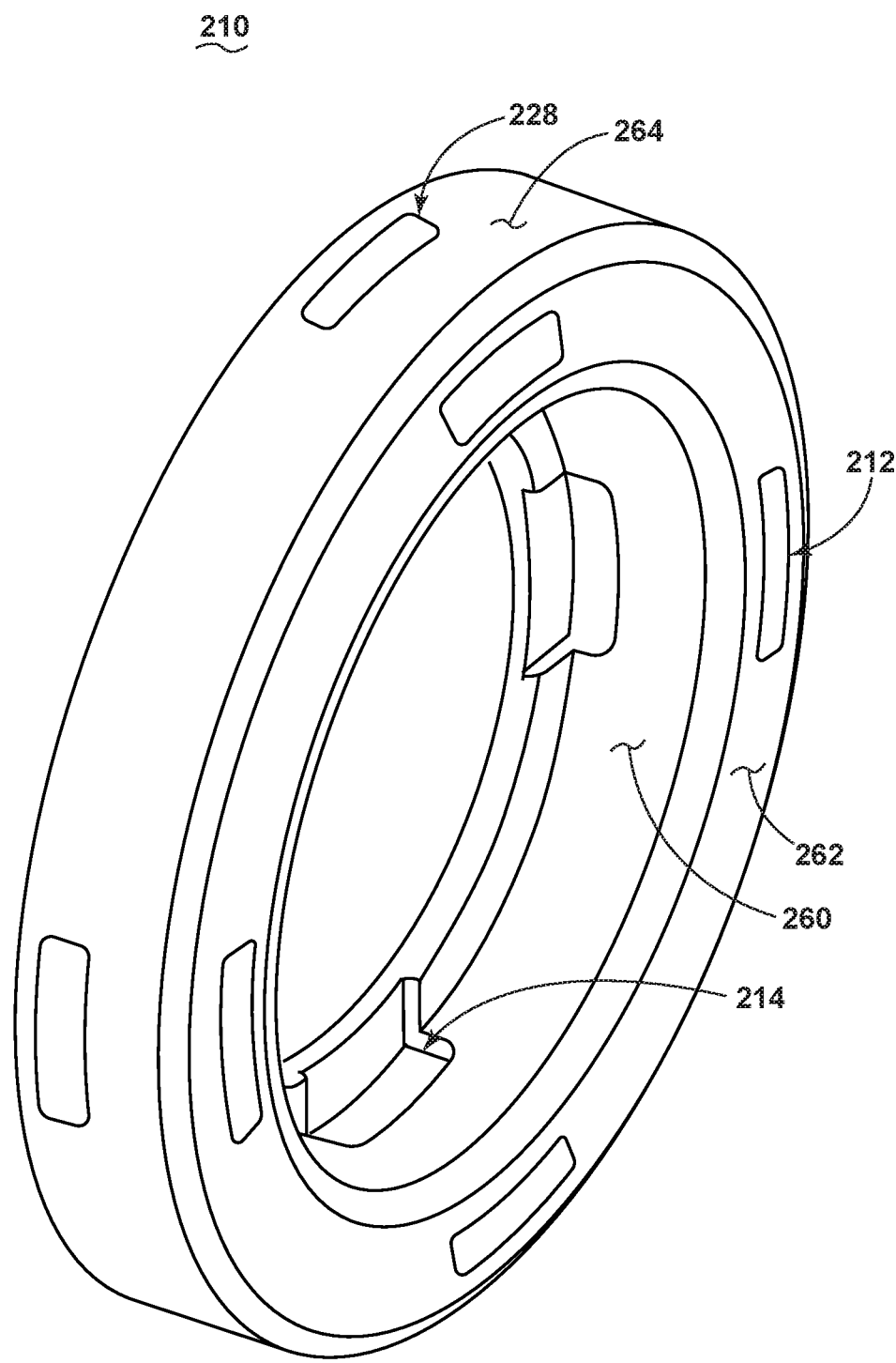
FIG. 7 is an isometric view of another end support of the generator of FIG. 1, in accordance with various aspects described herein.

FIG. 7 illustrates another end cap 210 according to another aspect of the present disclosure. The end cap 210 is similar to the end cap 110; therefore, like parts will be identified with like numerals increased to 200-series numbers, with it being understood that the description of the like parts of the end cap 110 applies to the end cap 210, unless otherwise noted. One difference is that the radially-outward surface 264 of the end cap 210 can define the set of second coolant openings 228, compared with the set of second openings 128 defined between the end cap 110 and the rotor core 100. As show, the end cap 210 also includes a set of axial openings 212 on an axially-outward surface 262 and a set of first coolant openings 214 at the radially-inward surface 260. Non-limiting aspects of the disclosure can be included wherein the set of first coolant openings 214 can further include surfaces adapted or configured to include a surface to direct or redirect the fluid coolant flow 85 as desired, to ensure or allow for proper flow toward the set of first coolant openings 214, the set of rotor windings 104, set of rotor winding end turns 130, or the like.

Figure 8:
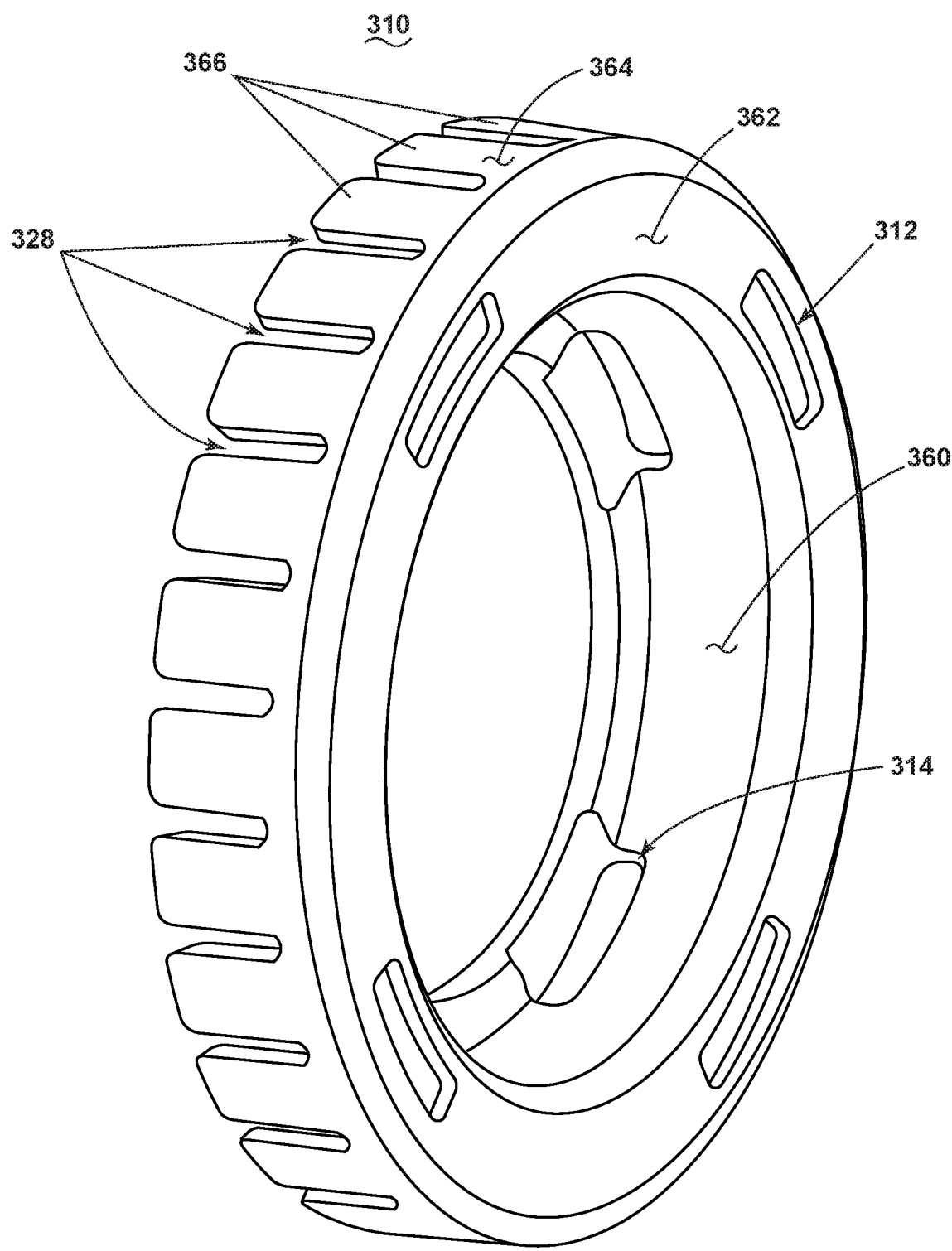
FIG. 8 is an isometric view of yet another end support of the generator of FIG. 1, in accordance with various aspects described herein.

FIG. 8 illustrates another end cap 310 according to another aspect of the present disclosure. The end cap 310 is similar to the end caps 110, 210; therefore, like parts will be identified with like numerals increased to 300-series numbers, with it being understood that the description of the like parts of the end cap 110, 210 applies to the end cap 310, unless otherwise noted. One difference is that the radially-outward surface 364 of the end cap 310 can define a set of axially extending teeth 366, between which define the set of second coolant openings 328. As show, the end cap 310 also includes a set of axial openings 312 on an axially-outward surface 362 and a set of first coolant openings 314 at the radially-inward surface 360. Additionally aspects of the disclosure, including but not limited to the set of axially extending teeth 366, the set of second coolant openings 328, the set of axial openings 312, the set of first coolant openings 314, or a combination thereof, can extend circumferentially along any portion of the end cap 310.

Many other possible aspects and configurations in addition to that shown in the above figures are contemplated by the present disclosure. For example, one aspect of the disclosure contemplates coolant passageway that extend along alternative portions or lengths of the exciter rotor 62. In another example, the windings or the coolant passageway can further include intervening thermally conductive layers to assist in thermal conduction while, for example, avoiding an electrically conductive relationship between respective components. Additionally, the design and placement of the various components such as valves, pumps, or conduits can be rearranged such that a number of different in-line configurations could be realized.

The aspects disclosed herein provide method and apparatus for cooling a set of exciter rotor windings or a set of rotor winding end turns during electric machine operations (e.g. motor or generator operations). One advantage that may be realized in the above aspects is that the above described aspects have significantly improved thermal conduction to remove heat from the set of exciter rotor windings or the set of rotor winding end turns. The improved thermal conductivity between the set of exciter rotor winding end turns and the coolant conduits coupled with the coolant channels provide for heat removal in a much more effective fashion from the rotor winding end turns to the coolant. Furthermore, the improved cooling of the set of exciter rotor windings further prevents issues associated with overheating windings, including but not limited to, insulation failure issues, mechanical failure of top containment band, arrested axial movement of containment band, and the like.

The increased thermal dissipation of the rotor winding end turns allows for a higher speed rotation, which may otherwise generate too much heat. The higher speed rotation may result in improved power generation or improved generator efficiency without increasing generator size. The described aspects having the fluid channels for the wet cavity machine are also capable of cooling the exciter stator windings or end turn segments which further reduces thermal losses of the electric machine. Reduced thermal losses in the electric machine allows for greater efficiency and greater power density of the generator.

When designing aircraft components, reliability is also informant feature. The above described end assembly can provide additional physics stability and improved cooling to the rotor end windings. The stability and cooling provided by the end support allow an increase in performance and reliability.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor for an electric machine comprising:
   a core having circumferentially-spaced, axially-extending posts;
   a winding carried by each of the posts and comprising an electrically-conductive wire repeatedly wound around the post such that a portion of the winding extends axially beyond the post to define an overhang with upper and lower surfaces connected by an axially-facing end; and
   a cradle supporting at least the lower surface of the overhang and having a first coolant opening fluidly coupled to the overhang lower surface, and a second coolant opening fluidly coupled to axially facing end of the overhang;
   wherein the coolant is received through the first coolant opening and expelled through the second coolant opening.

2. The rotor of claim 1 wherein the cradle supports at least one of the upper surface and end.

3. The rotor of claim 1 wherein the cradle supports the upper surface and end.

4. The rotor of claim 1 wherein the cradle overlies the upper surface of the overhang and defines a second coolant opening with the core.

5. The rotor of claim 4 wherein the cradle is spaced from the core to form a gap that defines the second coolant opening.

6. The rotor of claim 5 wherein the gap is axially aligned with a set of stator winding end turns radially spaced from the winding.

7. The rotor of claim 6 wherein the gap is a coolant outlet configured to radially emit a coolant toward the set of stator winding end turns.

8. The rotor of claim 7, further comprising an axial-facing wall proximate to the gap, wherein the wall is adapted to direct a coolant flow gathered at the wall toward the coolant outlet.

9. The rotor of claim 1 wherein the core defines an axial passage and further comprising a shaft located within the axial passage.

10. The rotor of claim 9 wherein the shaft comprises a coolant passage fluidly coupled to the first coolant opening.

11. The rotor of claim 10 wherein the shaft is hollow defining a rotor inner surface and a rotor outer surface, and the coolant passage extends between the inner and outer surfaces.

12. The rotor of claim 1 wherein the winding is a set of exciter windings.

13. A rotor for an electric machine comprising:
    a core having circumferentially-spaced, axially-extending posts, and defining an axial passage;
    a winding carried by each of the posts and comprising an electrically-conductive wire repeatedly wound around the post such that a portion of the winding extends axially beyond the post to define an overhang with upper and lower surfaces connected by an end;
    a hollow shaft defining a rotor inner surface and a rotor outer surface; and
    a cradle having a collar circumscribing the outer surface of the hollow shaft and a C-shaped channel supported by the collar and defining a first wall confronting the lower surface, a second wall confronting the upper surface, and a third wall confronting the end, with at least one of the first, second, and third walls having a coolant opening fluidly coupled to the overhang;
    wherein coolant is received through the coolant opening in the first wall, expelled through the coolant opening in the second wall, and expelled axially through the coolant opening in the third wall.

14. The rotor of claim 13 wherein the first and third walls having coolant openings.

15. The rotor of claim 14 wherein the coolant openings are slots.

16. The rotor of claim 13 wherein the shaft has at least one coolant passage extending between the inner and outer surfaces.

17. The rotor of claim 13 wherein the second wall terminates short of the core to define a gap that is fluidly coupled to the coolant opening to define a coolant path through the overhang.

18. The rotor of claim 17 wherein the gap is axially aligned with a set of stator winding end turns radially spaced from the winding.

19. The rotor of claim 13 wherein the winding is a set of exciter windings.

\* \* \* \* \*